United States Patent [19]

Neufeld

[11] 4,368,856
[45] Jan. 18, 1983

[54] FOLDING CRANK HANDLE FOR A FISHING REEL

[75] Inventor: Henry L. Neufeld, Tulsa, Okla.

[73] Assignee: Brunswick Corporation, Skokie, Ill.

[21] Appl. No.: 269,356

[22] Filed: Jun. 1, 1981

[51] Int. Cl.³ ............................................. A01K 89/00
[52] U.S. Cl. ................................. 242/84.1 J; 74/547
[58] Field of Search ...................... 242/84.1 J, 84.1 R, 242/84.2 R, 84.21 R, 84.26; 74/546, 547

[56] References Cited

U.S. PATENT DOCUMENTS 4,196,867  4/1980  Miller ........................... 242/84.1 J

FOREIGN PATENT DOCUMENTS 2752796  5/1979  Fed. Rep. of Germany ... 242/84.1 J
2023983  1/1980  United Kingdom ............ 242/84.1 J Primary Examiner—Billy S. Taylor
Attorney, Agent, or Firm—John G. Heimovics

[57] ABSTRACT

In the packaging of a fishing reel for shipment or storage the protrusion of the crank handle takes up unnecessary space. Separation of the handle from the reel for packaging often results in marring of the reel or handle as they rattle against each other. This invention sets forth a foldable crank handle. The crank handle has a base with a flat face. Extending into the base from the face and outward through its side is a slot. A pair of tabs are formed at the interface of the slot, face and base side. The crank handle is mounted to the reel by pivotally connecting an end of the axially movable crank rod, rotation of which retrieves the fishing line, into the slot. When the crank rod is secured in the position for fishing line retrieval the face of the base abuts a fitting, rotatably located in the bearing means, which has a recess or receptacle. In this position the crank handle may be operated to rotate the crank rod to retrieve fishing line. To fold the crank handle, the crank rod is loosened for axial movement. The crank handle is folded to position locating the tabs in the bearing recess. Securing the crank rod locks the tabs within the recess and crank handle in the folded position.

10 Claims, 9 Drawing Figures

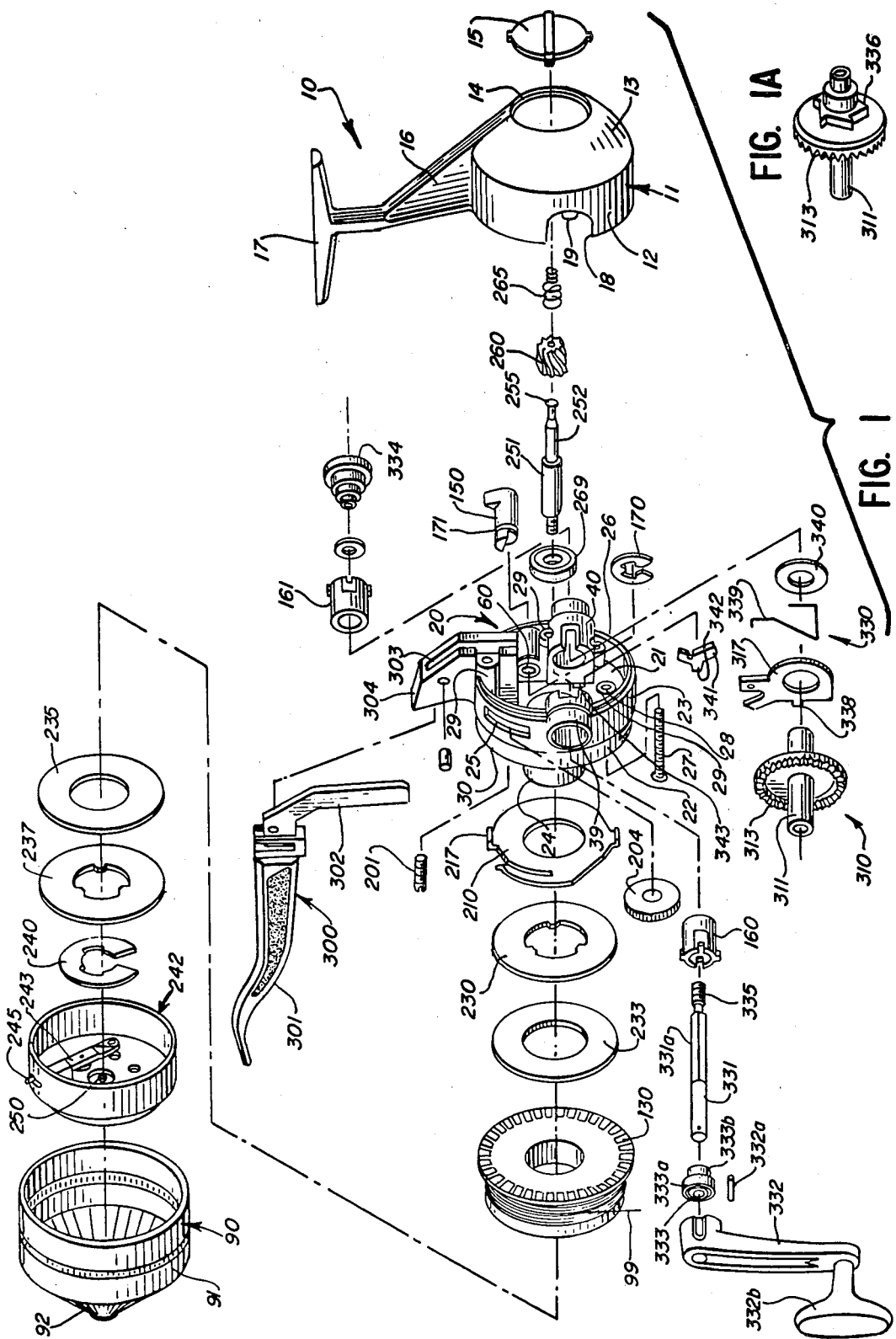

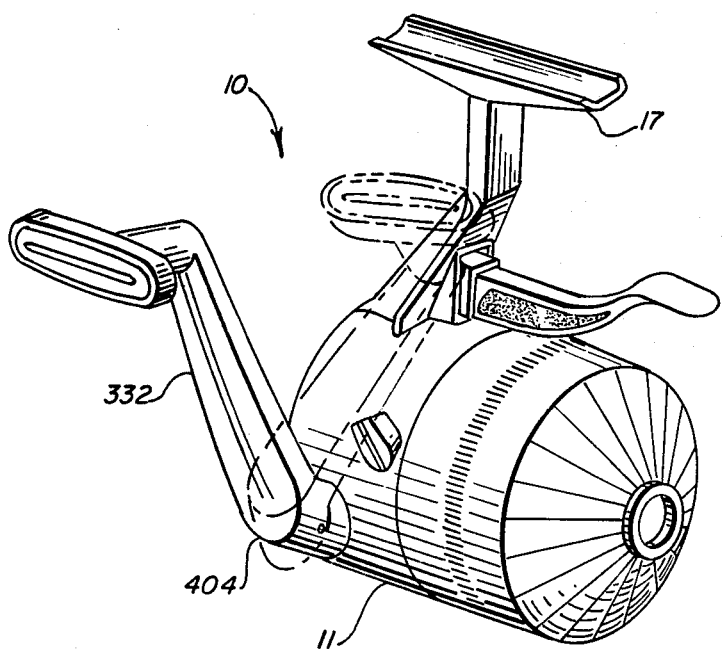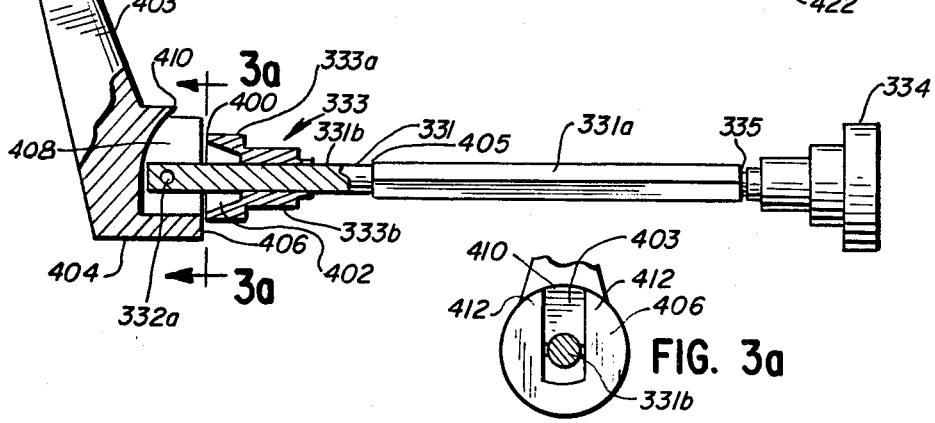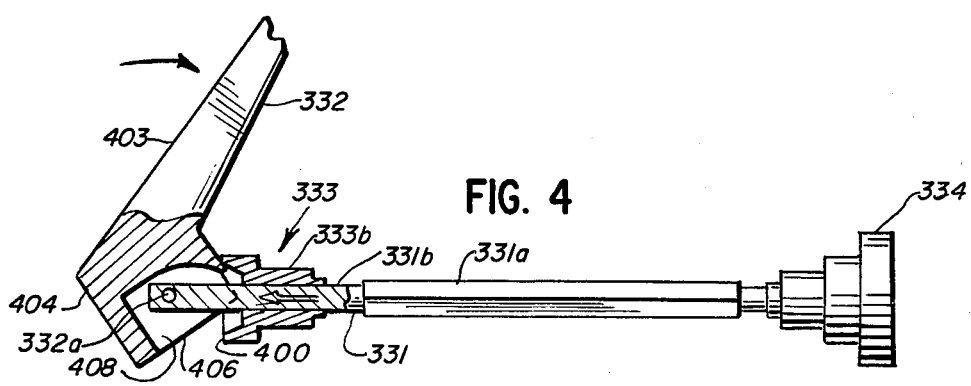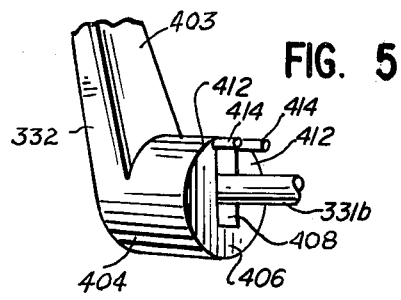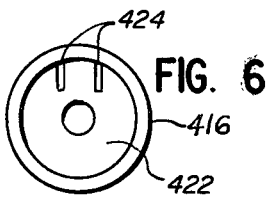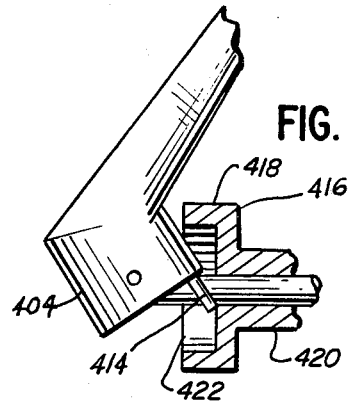

4,368,856

FOLDING CRANK HANDLE FOR A FISHING REEL

TECHNICAL FIELD

This invention relates to an improvement in fishing reels and, more particularly, it relates to an improved structure for the crank handle assembly of the fishing reel.

BACKGROUND ART

Fishing reels have crank handle assemblies which are operated to retrieve the fishing line. The protruding crank handle, which is rotated by the operator, presents a storage and shipment problem in that it takes up unnecessary space and is susceptible to damage.

It therefore has been known to provide some means to remove the crank handle from the reel for storage or shipment. However, the rattling of the crank handle and reel in its container mars the exterior of both parts and can additionally result in damage to either the reel or the crank handle or both.

SUMMARY OF THE INVENTION

A fishing reel of the type which retrieves fishing line by the rotation of a crank rod having a crank handle attached to one end. The housing has bearing sleeve means which supports the rotation of the rod and handle. One bearing means being manipulatable to free the rod for axial movement of the rod in the direction of the handle and the other receives, for rotation, a fitting interposed between it and the crank handle.

The base of the handle has a face which abuts the fitting to support the handle for rotation and has a slot extending outward from the base through the face and through the side of the base to form a pair of tabs. The base receives the crank rod into the slot where it is pinned so that the handle may pivot with respect to the rod toward the housing.

Upon freeing the rod for axial movement, the handle is folded toward the housing. A receptacle in the fitting receives the tabs and, when the rod is secured, holds the tabs to maintain the handle in the folded position for storage or shipment.

Should the receptacle of the fitting be such that it cannot hold the tabs, a pair of rod-like extenders are provided which engage the bottom of the receptacle or pocket enabling the handle to be held in the folded position.

BRIEF DESCRIPTION OF DRAWINGS

FIG. 1 is an exploded perspective view of an exemplary spin casting style fishing reel containing an embodiment of the invention described herein;

FIG. 1A is another perspective view of the crankshaft and gear;

FIG. 2 is a perspective view of a fishing reel containing the invention, with the crank handle shown in a position reversed from that of FIG. 1; and in the folded position (broken lines);

FIG. 3 is a fragmentary sectional view on an enlarged scale of the crank handle in position for retrieval of fishing line;

FIG. 3a is an end view taken on the line 3a—3a of FIG. 3 of the crank handle base;

FIG. 4 is a fragmentary sectional view of an enlarged scale illustrating the crank handle secured in the folded position;

FIG. 5 is a perspective view of an additional embodiment of the crank handle of this invention;

FIG. 6 is an end view of the receiver which receives the crank handle shown in FIG. 5; and FIG. 7 shows the crank handle of FIG. 5 secured by the receiver (shown in sectional view for clarity).

BEST MODE FOR CARRYING OUT THE INVENTION

FIG. 1 generally depicts an exploded perspective view of an exemplary fishing reel 10, shown as being of the spin casting type, which contains the preferred embodiment of the invention. The brief description which follows is offered to give a better understanding of the invention and its relationship within the fishing reel 10.

A back support housing 11, preferably made of an aluminum alloy material, has a cylindrical cover 12, one end of which is open and the other end of which merges into a semispherical rear wall 13 having a center opening 14 in which is seated a back cap 15. A stem 16 is integrally cast with the cylindrical cover 12 and has a mounting foot 17 which is used to attach the reel 10 to a fishing rod (not shown). A body 20, made of a plastic material, such as a glass filled polycarbonate, has a transverse deck plate 21 with a first or forward circumferential body portion 22 and a second or rearward circumferential body portion 23. A central hub 24 projects forward of the deck plate 21 with a drag plate 210, back spool washer 230, back flat drag washer 233, spool assembly 130, front flat drag washer 235, front spool washer 237, all secured to the hub 24 by means of spool retainer clip 240 which fits into a groove (not shown in FIG. 1) in the distal end of hub 24. The body 20 is secured to the back support housing 11 by inserting an inset flange 26 on the rearward body portion 23 of the body 20 into the one open end of the cylindrical cover 12 of the back support housing 11 and threading screws 27, only one of which is shown in FIG. 1, through apertures 28 in bosses 29 formed through and on the deck plate 21 and into mating bosses (not shown in FIG. 1) in the back support housing 11. A front cover 90, which has a cylindrical body portion 91 and a cone-shaped front portion 92, is secured on an offset portion 30 of the forward body portion 22.

A center shaft 251 is mounted in a center hole (not shown in FIG. 1) in the hub 24 with a spinner head assembly 242 threaded by means of the threaded opening 250 on the forward threaded end of the shaft 251. The spinner head assembly 242 partially surrounds the forward flange of the spool assembly 130 with fishing line 99 being wound thereon. The cone-shaped front portion 92 of the front cover 90 has a front hole (not shown in FIG. 1) which acts as a fishing line guide as the line 99 is cast from the reel 10 and rewound after casting.

A clutch head screw 201 passes through a pilot hole or guide (not shown in FIG. 1) in the deck plate 21 with the slotted head of the screw positioned in the interior of the forward body portion 22 and with a clutch wheel 204 projecting outward of a slot 25 in the rearward body portion 23 threadingly engaging with the body of the clutch head screw 201 where the screw projects into said rearward body portion 23. A tab 217 on the drag plate 210 fits into the head of screw 201 so that when the clutch wheel 204 is revolved upward toward stem 16, the screw 201 advances forward toward the spool retainer clip 240, increasing the clamping force on the spool assembly 130 so that the ability of the spool assembly 130 to revolve relative to the hub 24 is decreased. When the clutch wheel 204 is revolved away from the stem 16, the clamping force is decreased and the spool assembly 130 is permitted to revolve more freely relative to hub 24, thus providing the adjustable drag mechanism for the fishing reel 10.

The center shaft 251 is slidably and rotatably mounted in a bearing 269 which is mounted in the rear of the hub 24 in the deck plate 21. A pinion gear 260 is splined on a reduced diameter portion 252 of the center shaft 251 and is resiliently maintained in a forward position against the deck plate 21 by a center shaft spring 265. The pinion gear 260 and center shaft 251, being splined together, will have relative axial sliding motion, but rotation of the pinion gear 260 will rotate the center shaft 251. The spring 265 bears against an abutting end 255 on the center shaft 251 to urge the pinion gear 260 against the deck plate 21 and to urge the center shaft 251 in a rearward direction relative to the deck plate 21.

A finger brake lever 300 is mounted on the body 20 with an operating handle 301 exterior of and extending forwardly from the first or forward body portion 22. An operating leg 302 extends through a slot 303 in an upstanding bracket 304 on the body 20 and into the second or rearward body portion 23 for operable contact with the rearward end 255 of the center shaft 251. When the exterior operating handle 301 of the finger brake lever 300 is pulled upward toward the mounting foot 17, operating leg 302 engages the end 255 of the center shaft 251. The center shaft 251 and the spinner head assembly 242 mounted thereon are pushed forward relative to the bearing 269 and the hub 24. A pickup pin mechanism 243, mounted on and within spinner head assembly 242 is, at this point, in retracted position and cooperates with a forward face of a cam (not shown in FIG. 1) carried by the face of the hub 24. When the finger brake lever 300 is fully pivoted toward the mounting foot 17, the spinner head assembly 242 is held in a brake position against the inside of the front cover 90 to trap the line 99 therebetween to prevent casting of the line. Slightly releasing the finger brake lever 300 will maintain the spinner head assembly 242 in a forward casting position, but the spring 265 will retract the center shaft 251 and the spinner head assembly 242 enough to unclamp the fishing line 99 whereby the spinner head assembly 242 will not interfere with the fishing line 99 which can then be cast freely from the reel 10.

A crank assembly 310 is mounted in transversely extending hollow bearing bosses 39 and 40 integrally formed on the wall of the rearward body portion 23. Crank bearing sleeve means 160 and 161 are mounted respectively in the bearing bosses 39 and 40 to provide suitable bearings for a hollow crankshaft 311 of the crank assembly 310. The hollow crankshaft 311 supports an anti-reverse assembly 330.

A crank rod 331 is pivotally connected to a crank handle 332 by means of a pin 332a and the crank rod 331 is slip-fitted into the hollow crankshaft 311 and has flats 331a which mate with flats in the hollow crankshaft 311 to key the crankshaft 311 thereto. The crank handle 332, as subsequently described, can be pivoted or folded with respect to the crank rod 331 for ease of shipping and storage to protect the reel 10 from inadvertent damage. A fitting 333, which provides a rotatable supporting means for the crank handle 332 and slides on the crank rod 331 inwardly of the pin 332a, has an outer portion 333a that slides easily into one of the bosses 39 or 40 and has an inner portion 333b of smaller diameter which slides easily into the outer end of one of the crank bearing sleeve means 160 or 161. A crank rod nut 334 is secured to a threaded end 335 of the crank rod 331 to fasten said rod 331 to the reel 10. The crank rod 331 can be removed from the side of the reel 10 that it occupies in FIG. 1, and mounted in the opposite side by unfastening the nut 334 in sleeve means 161, removing the crank handle 332 and crank rod 331 from the hollow boss 39, inserting the crank rod 331 in the hollow boss 40, and refastening the nut 334 on the end of the rod in the sleeve means 160. The crank handle 332 has a crank knob 332b for gripping by the hand of the user.

Fixed to the hollow crankshaft 311 is a face gear 313 which is in engageable contact with the pinion gear 260 on the shaft 251 so that when the crank handle 332 is rotated in a forward direction (toward the front cover 90 as viewed in FIG. 1), the shaft 251 rotates causing the spinner head assembly 242 to rotate as well. This rotative motion disengages the pickup pin mechanism 243 from the forward face of the cam on the hub 24, causing the spinner head assembly 242 to move rearward as the pickup pin mechanism 243 rides up the cam to extend the pickup pin 245 outwardly beyond the spinner head assembly 242 so that the rotation of the crank handle 332 will rotate the spinner head assembly 242 to wind the fishing line 99 on the spool assembly 130.

Crank assembly 310 is coupled with an anti-reverse assembly 330, which comprises a ratchet 336, mounted on the crankshaft 311 against the back side of face gear 313 as shown in FIG 1A, an anti-reverse drag arm 337 having a transverse lug 338, a drag spring 339 and spacer washer 340 all mounted on the hollow crankshaft 311. An anti-reverse pawl 341, having a pivot tang 342 pivotably mounted in an aperture 343 in the deck plate 21, is positioned against the back of the face gear 313 between the deck plate 21 and the transverse lug 338 on the drag arm 337 for engageable and disengageable contact with the ratchet 336.

Anti-reverse actuator 150 is mounted in upper housing sleeve 60 that opens through the wall of the rearward body portion 23 of body 20, and the actuator 150 is retained in the sleeve 60 by retainer clip 170 seated in slot 171 in the body of the anti-reverse actuator 150. The anti-reverse actuator 150 is in cooperative contact with the anti-reverse drag arm 317. In one position, the actuator 150 disengages the anti-reverse assembly 330 permitting the crank rod 331 and the crank assembly to rotate in either the forward direction (upward toward the stem 16) or the reverse direction (downward from the stem 16 toward the back of the reel 10). In a second position of the actuator 150, the crank assembly cannot be rotated in either direction.

DESCRIPTION OF THE PREFERRED EMBODIMENT

In a preferred embodiment of the invention, reference is first made particularly to FIGS. 2 through 4 wherein the structure of the crank handle 332, crank rod 331 and fitting 333 which permits the crank handle 332 to be pivoted toward the mounting foot 17 of the reel for storage or shipment of the reel 10 is set forth. The handle 332, crank rod 331, fitting 333 and the nut 334 are shown in FIGS. 2 and 4 removed from the reel 10 to facilitate describing the relationship between the parts.

The fitting 333, which provides the supporting means for the crank handle 332, is rotatable about and axially moveable upon an un-splined portion 331b of the crank rod 331. With the crank rod 331 pinned by pin 332a to the handle 332, the fitting can move along the un-splined portion 331b of the crank rod between a cylindrical base 404 of the crank handle 332 and a shoulder 405 created by the splines 331a on the crank rod 331. When the crank rod 331 and crank handle 332 are secured within the reel 10, the fitting 333 is seated in either bearing sleeve 160 or 161 which in turn are seated in the bosses 39 and 40 respectively. The fitting 333 has an axially facing, flat, ring-shaped handle supporting face 400 which bears against and supports the crank handle 332 for rotation and retrieval of fishing line 99. Concentrically countersunk into the fitting 333, inward of the supporting face 400, is a conical receptacle 402 the purpose of which will hereinafter become evident.

As shown in FIGS. 3, 3a and 4 the crank handle 332 of this embodiment of the invention is composed of a crank arm 403 and the aforementioned cylindrical handle base 404. The diameter of the handle base 404, as seen in the drawings, is somewhat larger than the diameter of the fitting 333 and has a flat end constituting a base face 406. The base face 406 abuts the supporting face 400 of the fitting 333 to form the rotatable mounting for the crank handle 332 for the retrieval of fishing line 99. Extending outward from the handle base 404 through the base face 406 and through the side of the handle base 404 adjacent the handle arm 403 is a pivot slot 408. The un-splined portion 331b of the crank rod 331 is pivotally secured in the pivot slot 408 by the pin 332a so that the crank handle 332 may be pivoted or folded with respect to the crank rod 331. To accommodate the pivoting or folding action of the crank handle 332 the pivot slot 408 is of a depth and width so as not to come in contact with the un-splined portion 331b of the crank rod 331. It should also be noted that the bottom of the pivot slot 408 is arcuate so as to keep the size of the pivot slot 408 to a minimum and thereby maintain the strength and durability of the crank handle 332. Further, the arcuate bottom of the pivot slot 408 creates, where the pivot slot 408 emerges through the side of the handle base 404, a stop edge 410 which will engage the crank rod 331 to prevent additional pivoting of the crank handle 332 about the crank rod 331.

Viewing FIG. 3a it can be seen that the pivot slot 408 gives the base face essentially a U-shape and forms projecting means taking the form of a pair of crescent-shaped tabs 412 at the puncture of the base face 406, the pivot slot 408 and the side of the handle base 404. These tabs 412 provide, as discussed in detail below, the means whereby the crank handle 332 can be maintained in the folded or pivoted position.

With the above set forth and turning to the drawings the operation of the folding crank handle 332 can be set forth. In the operating position, wherein the crank handle 332 is to be maintained in position to be rotated by the operator to retrieve fishing line 99, the base face 406 is held in abutting engagement with the supporting face 400 of the rotatable fitting 333 by the tightened nut 334. The tightening of the nut 334, in effect, pulls the crank handle 322 toward abutting engagement with the supporting face 400 and, when the nut 334 is fully tightened, maintains this engagement. In this position the crank handle 332 cannot pivot about the crank rod 331 since any such motion would be opposed by the supporting face 400 of the fitting 333.

To fold the crank handle 332 toward the mounting foot 17 for storage or shipment, as shown in FIG. 2 by the broken lines, the nut 334 is loosened such that the axially movable crank rod 331 may be drawn toward the crank handle 332. As shown in FIG. 4, the crank rod 331 is drawn through the fitting 333 which frees the base face 406 from the support surface 400 and enables the crank handle 332 to pivot about the pin 332a toward the mounting foot 17. In pivoting or folding the crank handle 332 toward the mounting foot 17 the handle arm 403 contacts the support housing 11 or the body 20 which marks the full extent of the folding of the crank handle 332. During the pivoting or folding of the handle the tabs 412 pass into the tab receptacle 402 and, when the crank handle 332 is fully pivoted, the tabs 412 reside in the position substantially shown in FIG. 4. To maintain the folded position of the crank handle 332, the nut 334 is tightened which pulls the crank handle 332 inward toward the reel 10 and the tabs 412 snugly into the receptacle 402 and thereby holds the crank handle 332 in the folded position. In this position the crank handle 332 cannot move from or rattle against the reel 10 since it is restrained in the direction toward the housing 11 by its engagement by the crank handle 332 and cannot move in the direction away from the housing 11 due to the clasping of the tabs 412 by the tab receptacle 402. It should be noted that the configuration of other reels may be such that the engagement of the crank rod 331 by the stop edge 410 determines the full extent of the folding of the crank handle 332.

Turning to FIGS. 5 through 7 an additional embodiment is shown for fishing reels wherein the fitting is such that a portion of the handle base extends the fitting to support the crank handle for rotation to retrieve fishing line 99. Items having the same reference numerals as the previous embodiment are the same as described above.

FIG. 5 shows the crank handle 332 composed of a handle arm 403 and a cylindrical handle base 404 with a flat base face 406 and pivot slot 408. Pivotally mounted into the pivot slot 408 is a crank rod 331. Extending outward from the tabs 412 and perpendicular to the base face 406 are a pair of rod-like extenders 414.

The receiver 416, corresponding to fitting 333, has a cylindrical handle portion 418 which receives a portion of handle base 404 and a concentrical, lesser diameter bearing portion 420 which is rotatably mounted in either of the crank bearing sleeve means 160 or 161. The receiver 416 loosely passes the crank rod 331 for connection to the crank handle 332 and serves the same purposes as the fitting 333. The concentric, cylindrical pocket 422 extends into the receiver 416 to accept a portion of the handle base 404 when the crank handle 332 is in operating position to support the crank handle 332 against pivoting motion. Formed at the bottom of the pocket 422 are a pair of parallel, slot-like grooves 424 which receive the extenders 414 when the handle base 404 is inserted into the pocket 422.

Turning to FIG. 7, the folding of the crank handle 322 is accomplished in the same manner as previously described. Because of the large diameter of the pocket 422, the tabs 412 cannot be engaged by the receiver 416 upon tightening of the nut 334. However, in tightening of the nut 334, the extenders 414 engage the bottom of the pocket 422 so that when fully tightened, the nut 334 causes a force to be induced upon the extenders 414 which, in turn, exerts a moment upon the crank handle 332 to hold the handle arm 403 against the housing 11 or the body 20 or, depending upon the structure of the reel 10, holds the stop edge 410 against the crank rod 331.

The foregoing detailed description has been given for clearness of understanding only and no unnecessary limitations should be understood therefrom as modifications will be obvious to those skilled in the art.

I claim:

1. In a fishing reel having a housing, a crank handle having a cylindrical base, a crank rod pivoted to the base of the handle and passing into the housing, the crank rod being free for axial movement and being rotatable by the crank handle for retrieving a fishing line, bearing sleeve means mounted in the housing to support the crank rod for rotation, and crank handle supporting means seated in the bearing sleeve means and permitting the crank rod to rotatably and slidably support the crank handle for rotation, the improvement comprising:

the base on the handle having a base face, projecting means on the base;

a supporting face on the handle supporting means to bear against the base face on the handle to support the crank handle for rotation, and a receptacle in the supporting face to receive the projecting means when the crank handle is folded toward the housing.

2. In the fishing reel as claimed in claim 1 wherein means are provided on the crank rod for maintaining the crank handle in the folded position with the projecting means in the receptacle.

3. In a fishing reel as claimed in claim 1 wherein a slot is formed in the base through the base face, and wherein a pin passes through an end of the crank rod and through the walls forming the slot to pivotally mount the handle to the crank rod.

4. In a fishing reel as claimed in claim 3 wherein the crank rod nests into the slot when the crank handle is folded toward the housing.

5. In a fishing reel as claimed in claim 4 wherein the projecting means are tabs formed at the interface of the slot, the base face, and the side of the base.

6. In a fishing reel as claimed in claim 4 wherein the projecting means are a pair of extenders projecting from the base face of the base and wherein the receptacle includes a pair of grooves in the handle support means for receiving the extenders when the handle is in position to be rotated for retrieval of fishing line.

7. In a fishing reel of the type having a housing, a crank handle having a base, a crank rod pivoted to the base of the handle and passing into the housing, the crank rod being free for axial movement and being rotatable by the crank handle for retrieving of fishing line, bearing sleeve means mounted in the housing to support the crank rod for rotation, and crank handle supporting means seated in the bearing sleeve means and permitting the rod to rotatably and slidably support the crank handle for rotation, the improvement comprising:

the crank handle having a base with a base face, and a slot extending into the base through the face, the crank rod being pivotally mounted in the slot so that the crank handle can fold towards the housing, the slot extending through one side of the base to create a projecting means at the interface of the slot, the base face and side of the base; and the handle supporting means is a fitting having a supporting face to bear against the base face to support the crank handle for rotation and having a receptacle to receive the projecting means when the crank handle is folded to maintain the crank handle in the folded position.

8. In a fishing reel as described in claim 7, the improvement comprising:

said supporting means is a receiver having a pocket which receives the base; and a pair of extenders extending from the base face one on each side of the slot to bear against the bottom of the pocket when the crank handle is folded to maintain the crank handle in the folded position.

9. In a fishing reel as described in claim 8, the extenders comprise a pair of rods.

10. In a fishing reel as described in claim 9, the pocket has a pair of grooves to receive the rods when the crank handle is in position to be rotated for retrieval of fishing line.

* * * * *